(12) United States Patent
Ito et al.

(10) Patent No.: US 7,894,840 B2
(45) Date of Patent: Feb. 22, 2011

(54) METHOD OF SIMULTANEOUSLY-CONNECTIBLE CHANNEL SWITCHING

(75) Inventors: Tetsuya Ito, Tokyo (JP); Akira Matsumoto, Tokyo (JP)

(73) Assignees: NEC Communication Systems, Ltd., Tokyo (JP); NEC Infrontia Corporation, Kawasaki-shi, Kanagawa (JP)

( * ) Notice: Subject to any disclaimer, the term of this patent is extended or adjusted under 35 U.S.C. 154(b) by 774 days.

(21) Appl. No.: 11/822,740

(22) Filed: Jul. 9, 2007

(65) Prior Publication Data

US 2008/0020791 A1    Jan. 24, 2008

(30) Foreign Application Priority Data

Jul. 10, 2006   (JP) ............................. 2006-189860

(51) Int. Cl.
*H04B 7/00* (2006.01)
*H04B 15/00* (2006.01)

(52) U.S. Cl. ...................... 455/516; 455/63.3; 455/509; 455/522

(58) Field of Classification Search ........................ None
See application file for complete search history.

(56) References Cited

U.S. PATENT DOCUMENTS 6,246,713 B1 * 6/2001 Mattisson .................... 375/132

FOREIGN PATENT DOCUMENTS

JP  2002-271336   9/2002
JP  2004007195 A * 1/2004

OTHER PUBLICATIONS

Dictionary.com, "base station," in Dictionary.com Unabridged. Source location: Random House, Inc. http://dictionary.reference.com/browse/base station.*
The Illustrated Dictionary of Electronics, Turner, R. and Gibilisco, S., McGraw-Hill, inc., 1991.*
"Base station" definition, Techweb, Source location: http://www.techweb.com/encyclopedia/printView?term=base%20station&view=print.*
"Base station" definition, PCMagazine, Source location: http://www.pcmag.com/encyclopedia_term/0,2542,t=RF+base+station&i=60521,00.asp.*
"Base station" definition, WordIQ, Source location: http://www.wordiq.com/definition/Base_station.*
Terrestar's Integrated Satellite Communications located at http://www.terrestar.com/inc/pdf/Diagram.pdf.*

* cited by examiner

*Primary Examiner*—Matthew D Anderson
*Assistant Examiner*—Gennadiy Tsvey
(74) *Attorney, Agent, or Firm*—McGinn Intellectual Property Law Group, PLLC

(57) ABSTRACT

Disconnection of communication is prevented and a connecting relation is maintained between radio devices even when a communication channel is dynamically switched. Accordingly, when a first radio device switches a communication channel used for radio communication with a second radio device, the first radio device firstly switches to a simultaneously-connectable channel capable of a simultaneous communication with an original channel, and then switches to a destination channel.

34 Claims, 7 Drawing Sheets

F I G. 1
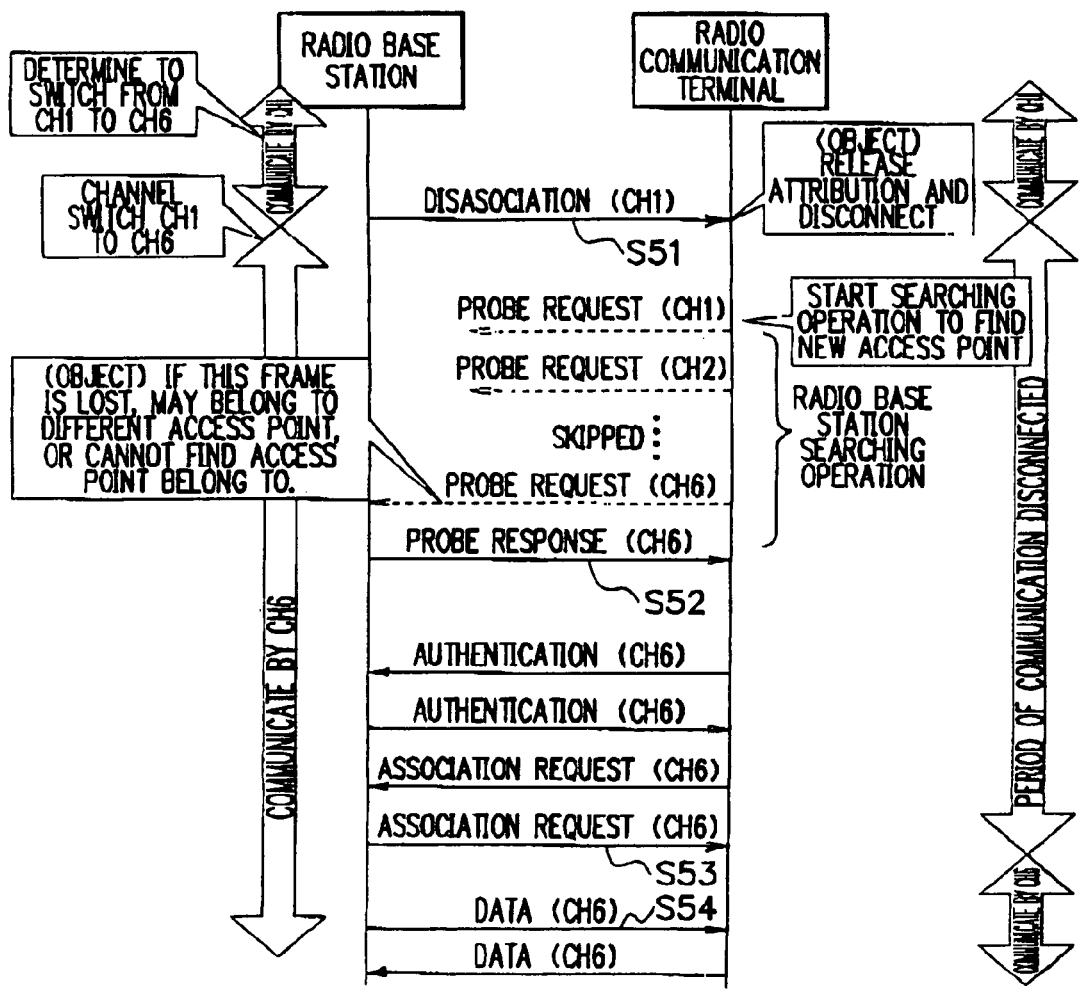
(RELATED ART)

F I G. 6
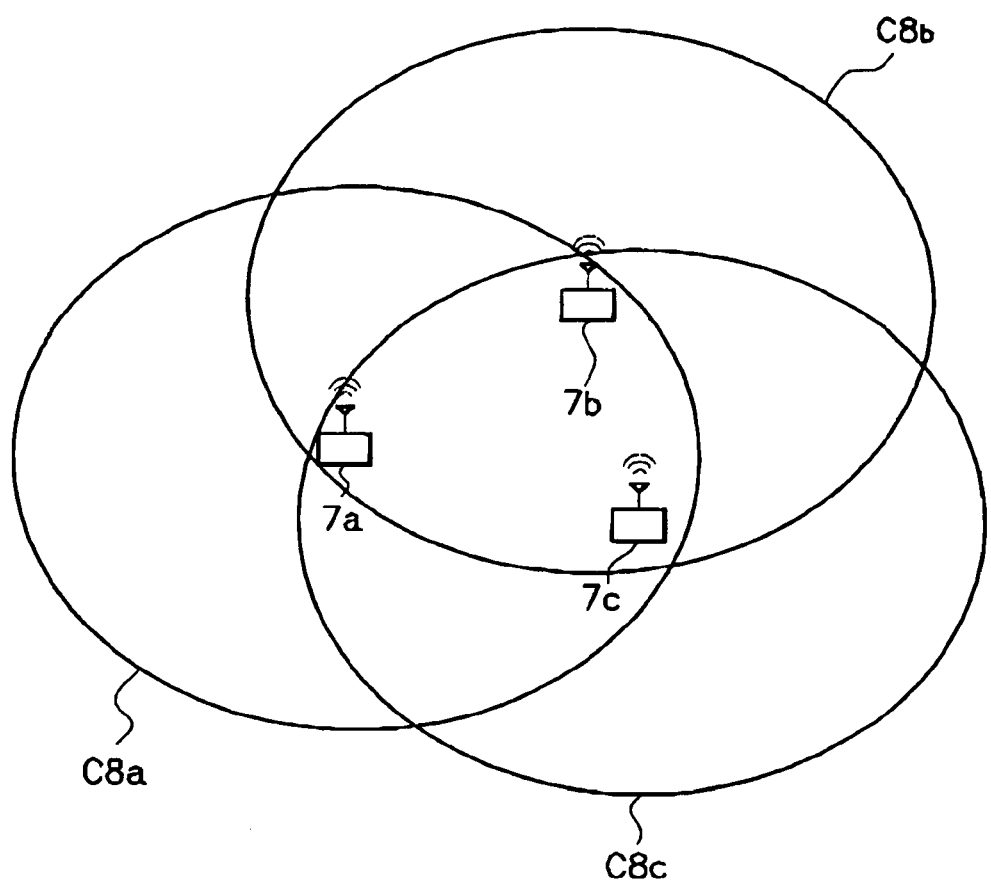

METHOD OF SIMULTANEOUSLY-CONNECTIBLE CHANNEL SWITCHING

This application is based upon and claims the benefit of priority from Japanese patent application No. 2006-189860, filed on Jul. 10, 2006, the disclosure of which is incorporated herein in its entirety by reference.

BACKGROUND OF THE INVENTION

1. Field of the Invention

The present invention pertains to a radio communication system, a radio device, a communication control method, and a communication control program in a computer-readable storage medium, applicable for radio communication using a plurality of communication channels between, for example, a radio base station and a radio communication terminal.

2. Description of Related Art

In communication channel allocations in a 2.4 GHz band wireless LAN (Local Area Network) of IEEE 802.11 method, for example, channels of approximately 20 MHz-bandwidth are arranged with intervals of 5 MHz so adjacent channels interfere with each other. Thus, only four channels (ch1, ch6, ch11, ch14) at a maximum are available in Japan, as channels that will not interfere (overlap) with each other. This is why a base station needs to be designed in a view of the four channels that will not interfere with each other within an area.

In such a radio communication system, communication channel switch will be performed, for example, when radio interference from other radio communication systems or radar such as weather radar in similar frequencies is detected.

In systems of the related art, a frequency channel switching device determines whether to switch a frequency channel based on dynamically-changing line status between corresponding wireless LAN devices and the wireless LAN devices switch to the determined frequency channel (for example, see Japanese Patent Application Laid-Open No. 2002-271336 (document 1)).

Next, problems of those radio communication systems related to the present invention will be described with reference to FIG. 1. FIG. 1 shows a channel switch procedure by a radio base station in related art by taking a control frame of IEEE 802.11 wireless LAN as an example. In FIG. 1, the dotted lines represent broadcast frames and the continuous lines represent unicast frames. The each frame uses a radio channel shown in the parentheses respectively and beacon frames and ACK (Acknowledge) frames are not shown.

When a communication channel is to be switched from ch1 to ch6 in the radio communication system shown in FIG. 1, a radio base station firstly releases its attribution to ch1 and switches the communication channel to ch6 (step S51).

The radio communication terminal disconnects the connection when releasing its attribution and starts a searching operation to find a new destination to attribute. Since the radio base station operates by ch6, the radio base station returns a probe response to a probe request of ch6 (step S52) to perform attribution process (step S53). With this, data are transmitted and received by ch6 (step S54).

As described above, in the attribution searching operation, an attribution is released once and searches a new attribution, so there has been a problem that the radio communication terminal may belong to a different radio base station after a communication channel switch.

Further, since the radio communication terminal disconnects the connection when releasing its attribution, communication cannot be operated after the attribution release and until the start of data transmission and reception by ch6.

Also, the art disclosed in document 1 is a technique for determining whether or not to switch a channel based on the line state and it is not made in view of preventing disconnection during a channel switch operation or maintaining a connection between the connected radio devices.

SUMMARY OF THE INVENTION

An exemplary object of the invention is to provide a radio communication system, a radio device, a communication control method, and a communication control program in a computer-readable storage medium, which prevent disconnection during a channel switch operation or maintaining a connection between radio devices even when a communication channel is dynamically switched.

A radio communication system according to an exemplary aspect of the invention includes a plurality of radio devices for radio communication by a plurality of communication channels. The plurality of radio devices include a first radio device for starting communication channel switching process and one or more second radio devices. The first radio device includes a channel switching unit that switches a communication channel to a destination channel after switching to a simultaneously-connectable channel capable of a simultaneous communication with an original channel which is currently communicating when the communication channel used for radio communication with the second radio device is to be switched.

A radio device according to an exemplary aspect of the invention, for radio communication by a plurality of communication channels, includes a channel switching unit that switches a communication channel to a destination channel after switching to a simultaneously-connectable channel capable of a simultaneous communication with an original channel that is currently communicating when the communication channel used for radio communication with a currently connected second radio device is to be switched.

A communication control method according to an exemplary aspect of the invention is used for a radio communication system including a plurality of radio devices for radio communications by a plurality of communication channels, the plurality of radio devices including a first radio device for starting communication channel switching process and one or more second radio devices. The method includes: a step for switching a communication channel to a simultaneously-connectable channel capable of a simultaneous communication with an original channel that is currently communicating when the first radio device switches the communication channel used for radio communication with the second radio device to the destination channel; and a step for switching to the destination channel after the simultaneously connecting step.

A communication control program according to an exemplary aspect of the invention is stored in a computer-readable storage medium for a radio communication system including a plurality of radio devices for radio communications by a plurality of communication channels, the plurality of radio devices including a first radio device for starting communication channel switching process and one or more second radio devices. The program, when executed, causes a computer to perform: switching a communication channel to a simultaneously-connectable channel capable of a simultaneous communication with an original channel that is currently communicating when the first radio device switches the communication channel used for radio communication with the second radio device to the destination channel; and switching to the destination channel after the simultaneously connecting process.

BRIEF DESCRIPTION OF THE DRAWINGS

Features of the disclosed embodiments will be described by way of the following detailed description with reference to the accompanying drawings in which:

FIG. 1 is a sequence diagram showing a conventional communication channel switch operation;

FIG. 6 is a block diagram showing a structure of a wireless LAN system according to a second embodiment;

DESCRIPTION OF EXEMPLARY EMBODIMENTS

A radio communication system, a radio device, a communication control method, and a communication control program in a computer-readable storage medium according to exemplary embodiments applied to a wireless LAN system will be described with reference to the drawings.

First Exemplary Embodiment

Firstly, an outline of a first exemplary embodiment will be described.

When a radio channel is switched in a wireless LAN system, the system provides a period for operating by a channel having communication channel band overlapping with that of an original or destination channel. During that period, the wireless LAN system is configured to perform communications by a plurality of demodulatable radio channels and control a transmission power level according to the frame content to be transmitted. Further, when the radio channel is switched in the wireless LAN system, the channel switch from an original channel to a destination channel is performed in a phased manner as checking the attribution condition of a radio communication terminal.

With these characteristics, according to the wireless LAN system, even when a dynamic radio channel switch is performed in the wireless LAN system, it is possible to continue the communication and to maintain the attribution condition.

As described above, according to the first exemplary embodiment, when a radio base station switches a radio channel, the radio base station does not release the attribution relation and provides a period to perform communications by a channel covering the communication channel range of the origin or destination channel.

For example, when switching an original channel ch1 to a destination channel ch6 in a conventional technique, a radio base station releases the attribution to ch1 in order to switch to ch6. On the other hand, according to this exemplary embodiment, the radio base station does not release the attribution and switches in a phased manner, to channels ch2, ch3, ch4 and ch5 covering the range of ch1 or ch6.

The wireless LAN system is configured to communicate by using a plurality of demodulatable channels during communications by the overlapping channels ch2, ch3, ch4 and ch5, and control the transmission power level according to a frame content to be transmitted. Accordingly, the radio communication terminal operates as if performing handover to another access point (radio base station) without disconnecting the connection with the radio base station.

Further, since the radio base station switches the radio channel in a phased manner as checking the attribution condition of the radio communication terminal, the attribution condition is maintained.

Next, the structure of the first exemplary embodiment will be described in detail with reference to the drawings.

Figure 2:
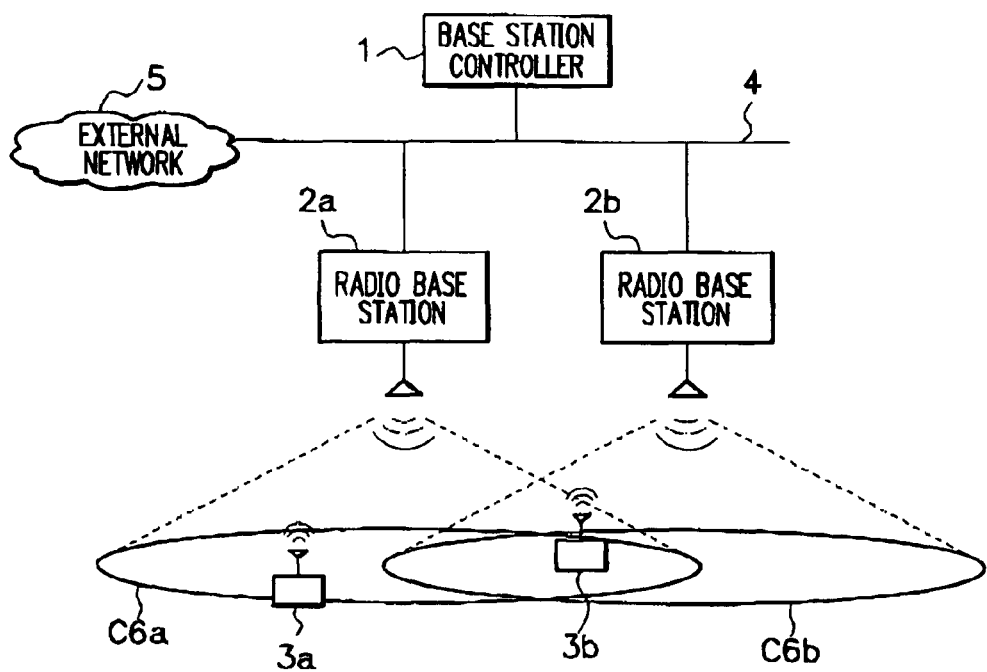
FIG. 2 is a block diagram showing a structure of a wireless LAN system according to a first embodiment.

As shown in FIG. 2, in the wireless LAN system, a base station controller 1 for controlling each radio base station and radio base stations 2a, 2b are connected via a network 4. Radio communication terminals 3 (3a 3b . . . ) are configured to perform radio communications with the radio base stations 2 (2a, 2b . . . ). The radio communication terminals 3 connect with the radio base stations 2 in a cell that is covered by the radio base stations 2 to communicate with another radio communication terminal or a device in an external network 5.

According to the example of FIG. 2, the radio communication terminal 3a is located in a cell C6a that is a coverage of the radio base station 2a and belongs to the radio base station 2a and the radio communication terminal 3b is located in a cell C6b that is a coverage of the radio base station 2b and belongs to the radio base station 2b. Since the radio communication terminals 3 include radio interfaces respectively, each of the radio communication terminals may belong to the same radio base station 2.

Figure 3:
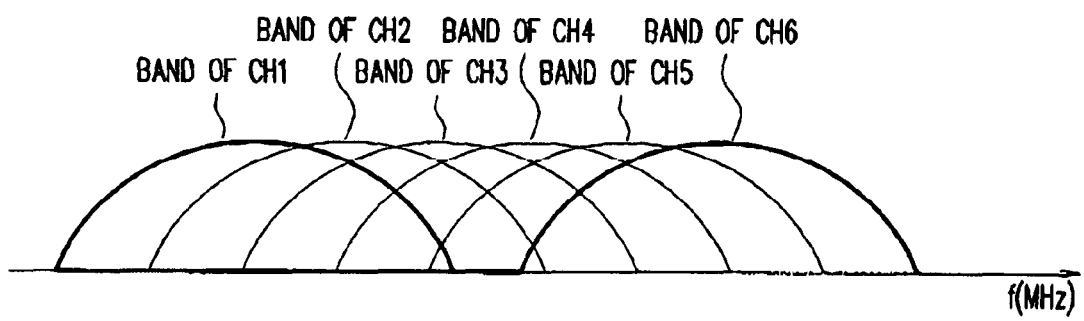
FIG. 3 is a diagram showing an arrangement of communication channels with respect to frequencies.

FIG. 3 shows an arrangement of communication channels. The radio communication system employs a method for utilizing a communication channel range by dividing into a plurality of ranges (radio channels) in order to have a plurality of radio devices available at the same time. According to FIG. 3, the radio channel is divided into radio channels ch1, ch2, ch3, ch4, ch5 and ch6.

The center frequencies of each radio channels are arranged in constant intervals and the communication channel bandwidths of each radio channel are wider than those intervals so that the communication channel bands (frequency bands) of adjacent radio channels are overlapped with each other. According to FIG. 3, only the channels ch1 and ch6 have communication channel band that are not overlapped with each other.

In a multi-cell environment having a plurality of cells as shown in FIG. 2, when communication channel bands of radio channels are overlapped, the communication is interfered by each other so that the communications are affected, even when radio channels are different in those adjacent cells. In other words, since the communication channel bands are overlapped, communication data of different radio channels can be demodulated correctly, depending on the modulating method.

According to FIGS. 2 and 3, it is preferable that one of the radio base stations 2a, 2b uses the radio channel ch1 and the other uses the radio channel ch6 in order to properly perform communication by the radio communication terminal 3b that is located in an area where the cells C6a and C6b are overlapped without any interference.

Figure 4:
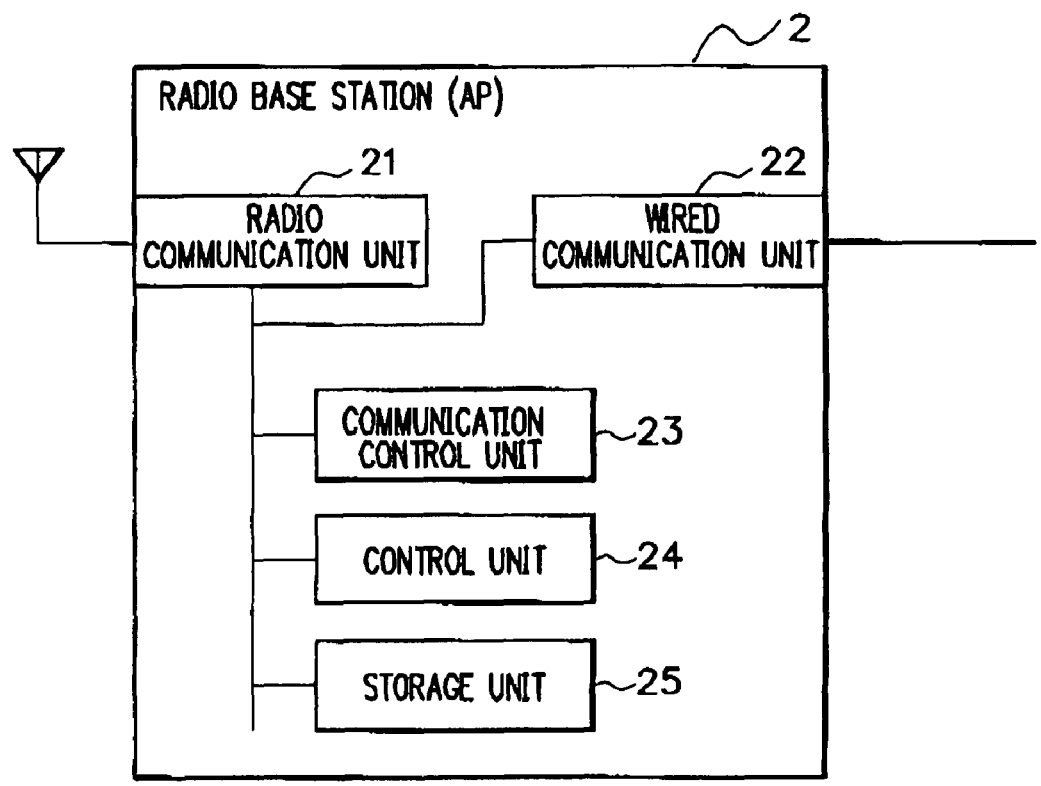
FIG. 4 is a block diagram showing a structure of a radio base station 2 according to the first embodiment.

As shown in FIG. 4, the radio base station 2 includes a radio communication unit 21 for performing radio communication with other devices such as the radio communication terminal 3, a wired communication unit 22 for performing wired communication with other devices such as the base station controller 1, a communication control unit 23 for controlling communications such as determining or switching of communication channels used for radio communications, a control unit 24 for controlling the entire operation of the radio base station 2, and a storing unit 25.

Next, an operation of the radio communication system will be described.

A channel switch operation in the structure shown in FIGS. 2 and 3 will be described. Here, the radio base stations 2a, 2b originally use ch1 and the radio base station 2a will switch from ch1 to ch6. That is, the original channel is ch1 and the destination channel is ch6.

Figure 5:
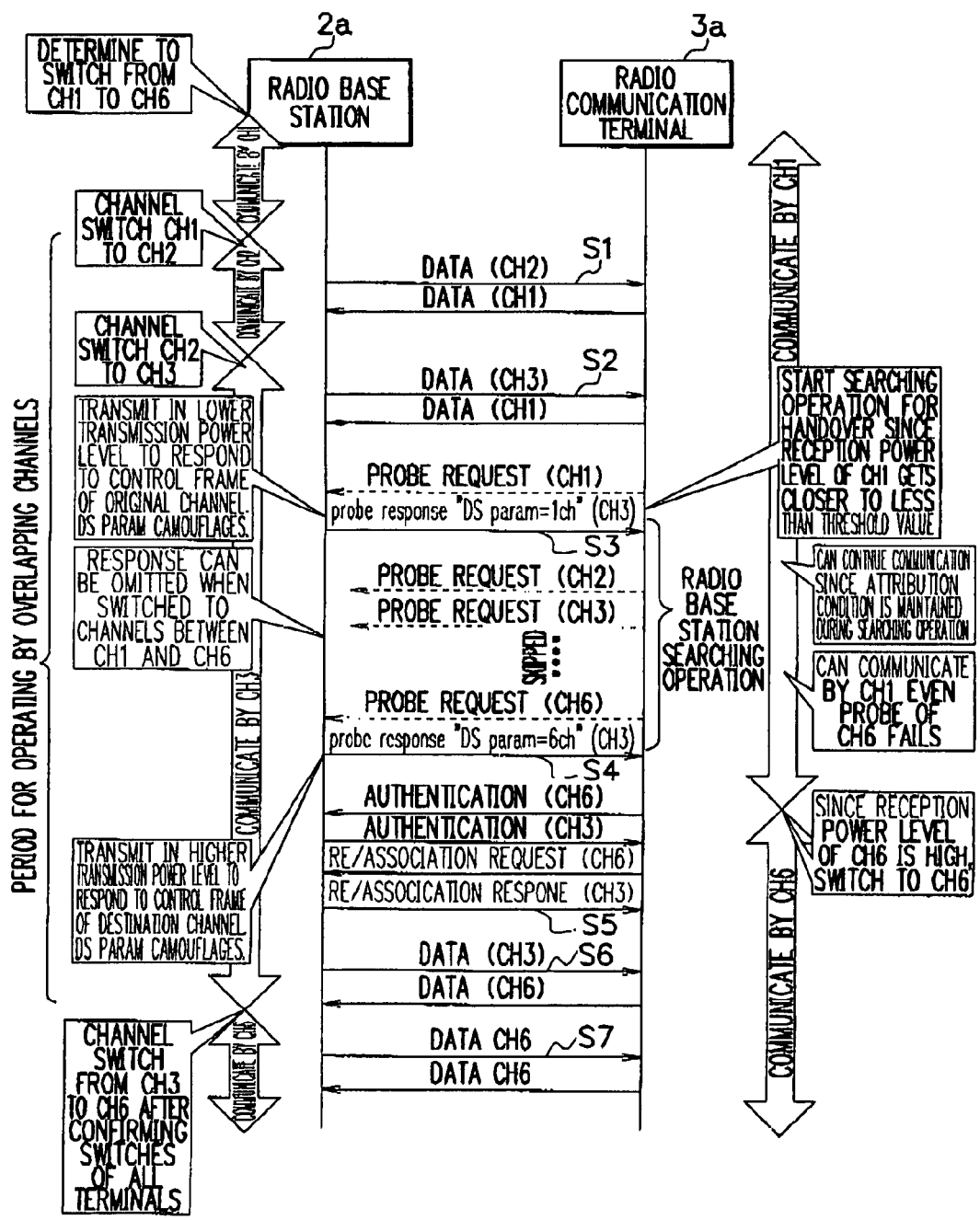
FIG. 5 is a sequence diagram showing a communication channel switch operation according to the first embodiment.

FIG. 5 shows a channel switch process of the radio base station according to the first exemplary embodiment. In FIG. 5, a control frame of IEEE 802.11 wireless LAN is employed.

In FIG. 5, the dotted lines represent broadcast frames and the continuous lines represent unicast frames. Each frame uses the radio channels shown in parentheses respectively and beacon frames or ACK frames are not shown.

When a communication channel is to be switched from ch1 to ch6, the radio base station 2 switches channels one by one starting with ch2 so as to switch to closer channels from the original channel to the destination channel. Firstly, the radio base station 2 switches to ch2 to transmit and receive data (step S1).

As shown in FIG. 5, when the radio base station 2 switches to ch3, the radio communication terminal 3a checks reception state of data transmission and reception (step S2), and starts a base station searching operation. Here, the radio communication terminal may start the base station searching operation when reception level of beacon frame from a base station is lower than a predetermined threshold value due to handover, in addition to the detection of reception state of data transmission and reception.

As shown in FIG. 5, in the base station searching operation, the radio communication terminal 3a transmits a probe request as a broadcast frame as switching the communication channel from ch1 to ch6 and receives a probe response (connectable notification frame) as a response frame from the radio base station.

Upon receiving the probe request, the radio base station 2a camouflages as if "ch1" is being used by transmitting a probe response (connectable notification frame) as a response frame by a transmission power level lower than a normal transmission power level (step S3). The value of the "transmission power level lower than a normal transmission power level" may be a predetermined value or may be obtained by any method.

Here, the "normal transmission power level" is a transmission power level in a condition that any particular process is not implemented, that is the condition before starting the communication channel switching process (before step S1 starts) or after completing the communication channel switching process (after step S7).

In the base station searching operation, the radio communication terminal 3a starts to transmit probe requests by each communication channels sequentially, starting with ch2. Here, radio communication for data frames can be performed during the base station searching operation since the radio communication terminal 3a maintains to the attribution relation to the radio base station 2a.

To the probe request by the communication channels ch2 to ch5 on the way to the destination channel ch6, the radio base station 2a may transmit a response frame (probe response) or may skip the transmission. Then, upon receiving the probe request from the destination channel ch6, the radio base station 2a camouflages as if "ch6" is being used by transmitting a probe response (connectable notification frame) in a transmission power level higher than a normal transmission power level, as a response (step S4). The value of the "transmission power level higher than a normal transmission power level" may be a predetermined value or may be obtained by any method.

Upon receiving the probe response by the transmission power level higher than a normal transmission power level in this way, the radio communication terminal 3a determines that the reception power level of ch6 is high and switches to the communication channel to ch6. Then, the radio communication terminal 3a performs attribution process to the radio base station 2a by ch6 (step S5).

After the radio communication terminal 3a switches to ch6, the radio base station 2a transmits and receives data with radio communication terminal 3a in ch6 by using data camouflaging as ch6 by ch3 until all radio communication terminals belonging to the radio base station 2a are switched to ch6 (step S6).

The data frame transmitted from the radio base station 2a by ch3 in step S6 may be transmitted in a transmission power level higher than the normal transmission power level.

In the above channel switch to ch3, if switching of all of the radio communication terminals belonging to the radio base station 2a to ch6 does not complete, the radio base station 2a further switches to ch4 and ch5 until all of the radio communication terminals are switched. Here the data frame transmitted to the radio communication terminal 3a, which has already been switched, is transmitted using data camouflaging, as ch6 by ch4 or ch5 by the radio base station 2a.

When the switches of the all radio communication terminals to ch6 do not complete even by switching to ch5, it may switch back to ch4 once and then switch to ch5 again.

Once it is confirmed that all radio communication terminals belonging to the radio base station 2a are switched to ch6, the radio base station 2 switches the communication channel to ch6 and ends to switch communication channels between the original channel and the destination channel (that is, ch4 and ch5 in FIG. 5). Then, normal data transmission and reception are performed by ch6 (step S7).

In this way, the radio base station 2 controls the transmission power level according to frame content to be transmitted during a communication channel switch. In other words, the radio base station 2 transmits a probe response in response to a probe request from the original channel ch1 in a transmission power level lower than the normal transmission power level and a probe response in response to probe request from the destination channel ch6 in a transmission power level higher than the normal transmission power level.

In this way, the radio base station 2 uses lower transmission power level for frames of radio channels closer to the original channel and higher transmission power level for frames of radio channel closer to the destination channel to lead the radio communication terminal 3 to belong to the destination channel.

As described above, during the operation in channels overlapping their communication channel bands with each other, the radio base station is capable of decoding communication data from the original or destination channel. Accordingly, the radio communication terminals belonging to the base station can perform a radio base station searching operation while maintaining a communication connection.

As described above, according to the present exemplary embodiment, while the radio base station 2 switches from original channel to the destination channel, communication is performed as switching to a channel so that it is possible to connect with at least one of the other channels at the same time and the radio channel is switched by a handover operation by the radio communication terminal 3. Therefore, communication with the radio communication terminal 3 will be maintained. According to this method, even when the destination radio base station searching operation of the radio communication terminal fails, the communication is maintained since the attribution condition to the original channel is maintained.

The radio base station switches the radio channel in phased manner as checking the radio channel switches of radio communication terminal belonging to the radio base station.

In this way, according to the first exemplary embodiment, in a channel switch process of a wireless LAN device, a period for operating by channels whose communication channel bands are overlapped is provided and, during the period, communication is performed by the plurality of channels. The radio base station 2 controls the transmission power level according to frame content to be transmitted. Further, the radio base station 2 switches channels in a phased manner from an original channel to a destination channel as checking attribution and synchronization conditions of the radio communication terminal 3.

Therefore, the following effects can be obtained.

The first effect is that channel switch of the radio base station is performed without disconnecting the communication with the radio communication terminal 3.

This is because, in the channel switching process, a period for operating by channels whose communication channel band overlaps with the original or destination channel is provided so that the radio device is capable of communicating by a plurality of channels.

The second effect is that a channel switch of the ratio base station is performed while the attribution condition of the terminal is maintained.

This is because, in addition to the reason of the first effect, the radio base station controls transmission power level according to frame content to be transmitted to lead to the destination channel. This prevents the radio communication terminal 3 from belonging to a different radio base station after the communication channel switch.

The third effect is that a channel switch of radio base station is performed as preventing a failure of re-attribution to the radio communication terminal.

This is because, in addition to the reasons of the first and second effects, channel switch is performed in a phased manner as checking the attribution condition of the radio communication terminal. In this way, the radio communication terminal 3 can find the original radio base station after a communication channel switch, and the attribution relation is not lost.

According to the first embodiment, as shown in FIG. 2, the base station controller and the radio base station are provided as separated devices and they are connected with wire; however, the functions of controlling base station may be included in the radio base station. In other words, each of the radio base stations 2a, 2b may work as the base station controller 1.

Further, according to FIG. 5, a radio base station searching operation is performed by transmitting and receiving probe frames; however, it should not be limited to this. The present invention may be realized when the beacon frames from the radio base station are received as connectable notification frames to search the radio station.

Second Exemplary Embodiment

A structure of a second exemplary embodiment will be described with reference to the drawings.

Radio communication is performed between radio communication terminals as substitute for the radio communication between the radio base station and the radio communication terminal in the first exemplary embodiment. Explanations for the same components as the first exemplary embodiment are omitted here.

The structure of the second exemplary embodiment will be described in detail with reference to the drawings.

As shown in FIG. 6, a radio network includes radio communication terminals 7a, 7b, 7c connected each other for radio communication but does not include a radio base station.

As shown in FIG. 6, the radio communication terminals 7a, 7b, 7c are located in areas C8a, C8b, C8c respectively and constitute an IEEE 802.11 ad-hoc network (IBSS; Independent Basic Service Set).

Figure 7:
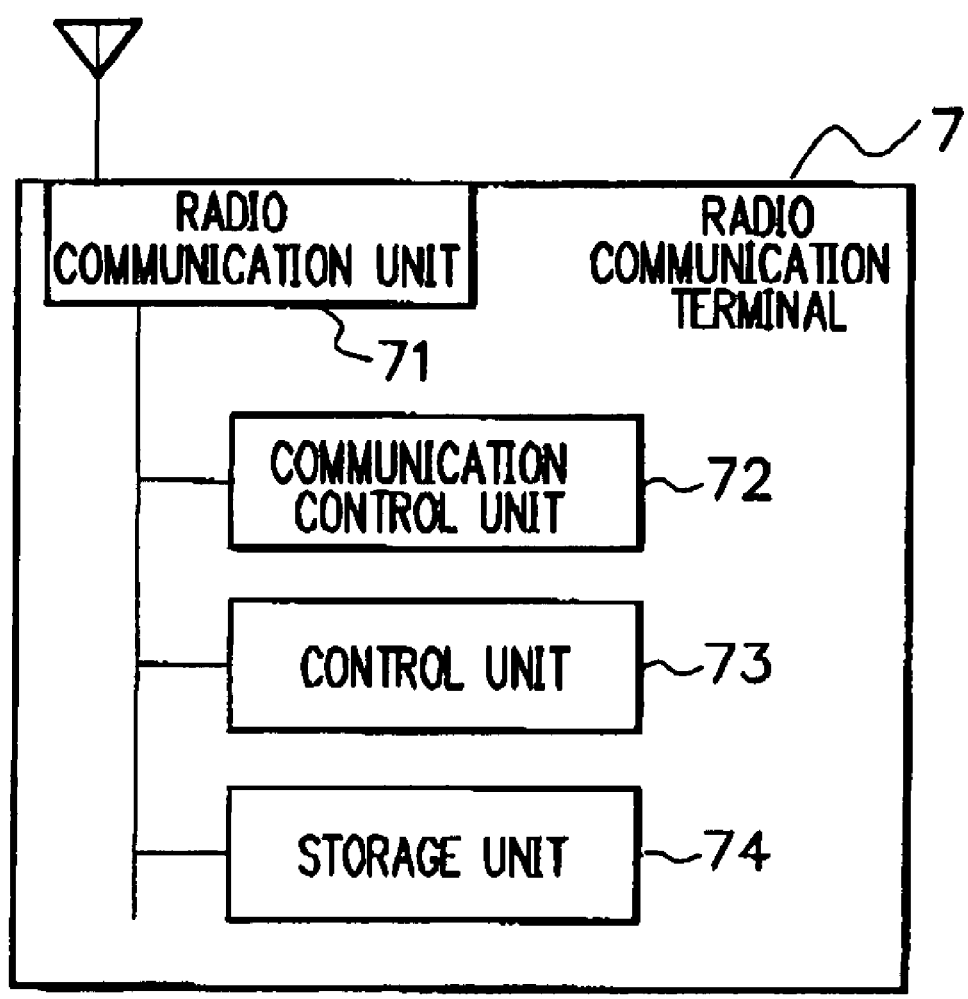
FIG. 7 is a block diagram showing a structure of a radio communication terminal 7 according to the second embodiment.

As shown in FIG. 7, the radio communication terminal 7 includes a radio communication unit 71 that performs radio communications with another radio communication terminal 7 or the like, a communication control unit 72 that controls communication by determining or switching communication channels for radio communications, a control unit 73 that controls an entire operation of the radio communication terminal 7, and a storing unit 74.

Next, an operation of the radio communication system according to the second exemplary embodiment will be described.

The radio communication terminals 7a switches channels from ch1 to ch6, where ch1 is an original channel and ch6 is a destination channel while the radio communication terminals 7a, 7b, and 7c operated only through ch1 in FIGS. 6 and 3.

Figure 8:
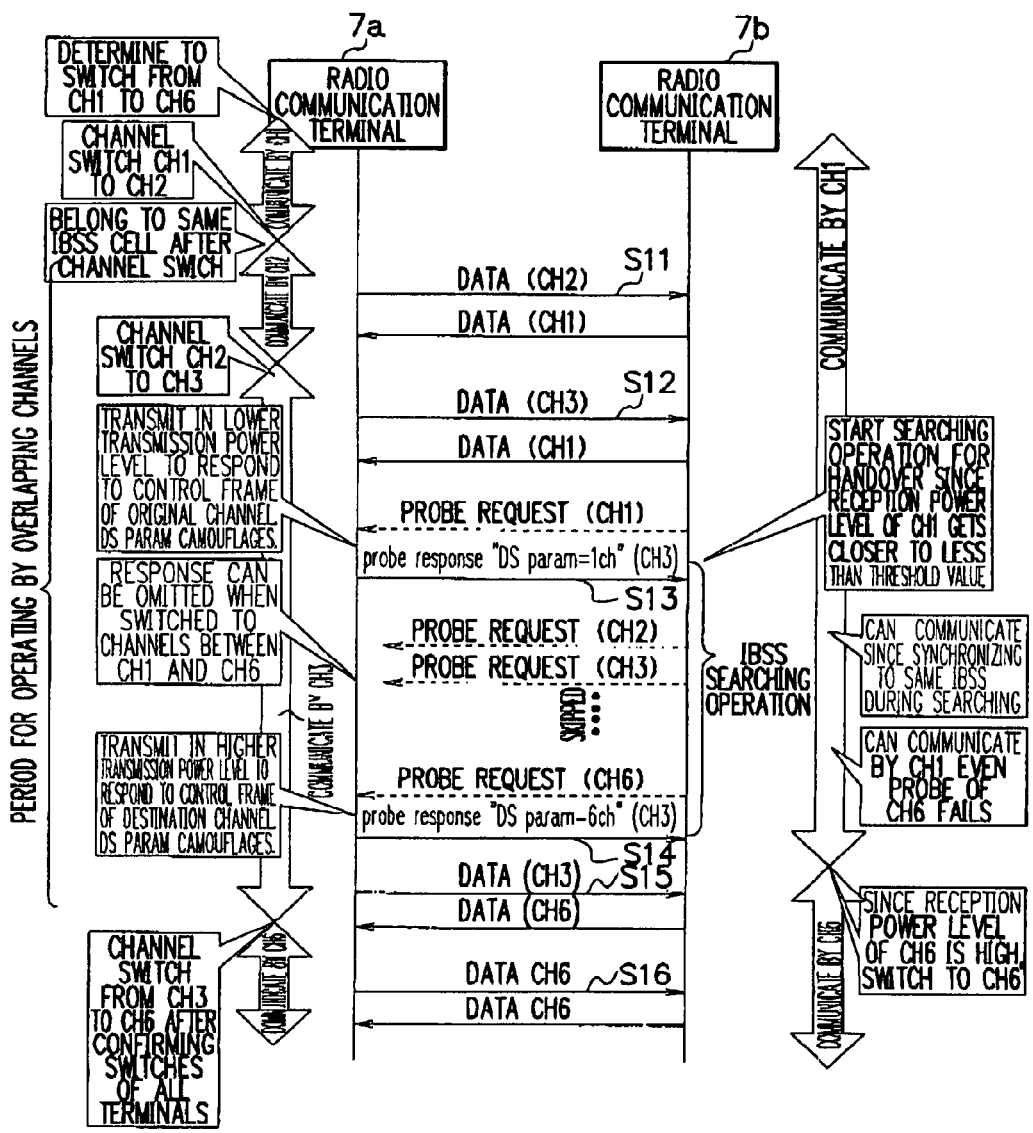
FIG. 8 is a sequence diagram showing a communication channel switch operation according to the second embodiment.

FIG. 8 shows a channel switching process of the radio communication terminal. In FIG. 8, a control frame of the IEEE 802.11 wireless LAN is employed.

In FIG. 8, the dotted lines represent broadcast frames and the continuous lines represent unicast frames. Here, each frame uses radio channel shown in parentheses respectively and beacon frames and ACK frames are not shown. Further, in order to simplify the explanation, the operations of the radio communication terminal 7c are omitted in FIG. 8.

When a communication channel is switched from ch1 to ch6, the radio communication terminal 7a switches channels one by one, starting with ch2, so as to get closer to the destination channel from the original channel. Firstly the radio communication terminal 7a switches to ch2 to perform data transmission and reception (step S11).

As shown in FIG. 8, when the channel is switched to ch3, the radio communication terminal 7b checks reception state of the data transmission and reception (step S12) and starts an IBSS searching operation. Here, the radio communication terminal may start the IBSS searching operation when the reception power level of beacon frame from a base station is lower than a predetermined value, in addition to the detection of the error in reception state of data transmission and reception.

As shown in FIG. 8, the radio communication terminal 7b performs the IBSS searching operation by transmitting a probe request as a broadcast frame as switching the communication channel from ch1 to ch6 and receiving a probe response (connectable notification frame) as a response frame from the radio communication terminal 7a.

Upon receiving the probe request, the radio communication terminal 7a camouflages as if "ch1" is being used by transmitting the probe response (connectable notification frame) as a response frame in a transmission power level lower than the normal transmission power level (step S13). The value of the "transmission power level lower than a normal transmission power level" may be a predetermined value or may be obtained by any method.

In the base station searching operation, the radio communication terminal 7b starts to transmit probe request sequentially to each communication channels, starting with ch2. Here, during the IBSS searching operation, radio communication of data frames can be performed since the connection to the radio communication terminal 7a is maintained.

To the probe requests of communication channels ch2 to ch5 on the way to the destination channel ch6, the radio communication terminal 7a may transmit response frame (probe response) or may skip the transmission. Then, upon receiving a probe request of the destination channel ch6, the radio communication terminal 7a camouflages as if "ch6" is being used by transmitting a probe response (connectable notification frame) as a response in a transmission power level higher than the normal transmission power level (step S14). The value of the "transmission power level higher than a normal transmission power level" may be a predetermined value or may be obtained by any method.

In this way, upon receiving the probe response in the transmission power level higher than the normal transmission power level, the radio communication terminal 7b determines that the reception power level in ch6 is high and switches the communication channel to ch6. Then, the radio communication terminal 7a performs data transmission and reception with the radio communication terminal 7b of ch6 by ch3 camouflaging as ch6 until all radio communication terminals connected to the radio communication terminal 7a are switched to ch6 (step S15).

The data frame transmitted from the radio communication terminal 7a by ch3 in step S15 may be transmitted in a transmission power level higher than the normal transmission power level.

In the channel switch to ch3, when channel switches to ch6 of all of the radio communication terminals connected to the radio communication terminal 7a are not completed, the radio communication terminal 7a further switches to ch4 and ch5 until the switches of all radio communication terminals are completed. Here, the radio communication terminal 7a transmits a data frame addressed to the radio communication terminal 7b, which has already switched, by ch4 or ch5 as data camouflaging ch6.

When the switches of all radio communication terminals to ch6 are not completed even by switching to ch5, the channel may be switched back to ch4 once and then switched to ch5 again.

Once it is confirmed that all radio communication terminals connected to the radio communication terminal 7a are switched to ch6, the radio communication terminal 7a switch the communication channel to ch6 and ends to switch communication channels between the original channel and the destination channel (that is, ch4 and ch5 in FIG. 8). Then, data transmission and reception are performed by ch6 (step S16).

In this way, the radio communication terminal 7a of the present embodiment controls the transmission power level according to frame content to be transmitted when switching a communication channel. In other words, the radio communication terminal 7a transmits a probe response to the probe request from the original channel of ch1 in a transmission power level lower than the normal transmission power level and a probe response to the probe request from the destination channel of ch6 in a transmission power level higher than the normal transmission power level.

In this way, the radio communication terminal 7a leads the radio communication terminal 7b to connect to the destination channel by using the low transmission power level of frames addressed to radio channels close to the original channel and high transmission power level of frames addressed to radio channels close to the destination channel.

As described above, during the operation in channels overlapping their communication channel bands with each other, the radio communication terminal 7a, which starts the communication channel switch operation, is capable of decoding communication data from the original or destination channel. Accordingly, the radio communication terminal 7b connecting to the radio communication terminal 7a performs a destination radio communication terminal searching operation while maintaining a communication with the radio communication terminal 7a.

As described above, according to the present exemplary embodiment, while the radio communication terminal 7a switches from original channel to the destination channel, communication is performed as switching to a channel so that it is possible to connect with at least one of the other channels at the same time and the radio channel is switched by a handover operation by the radio communication terminal 7b. Therefore, communication with the radio communication terminal 7b is maintained. According to this method, even when the destination radio communication terminal searching operation of the radio communication terminal 7b fails, the communication is maintained since the attribution condition to the original channel is maintained.

The radio communication terminal 7a, that starts the communication channel switch process, switches the radio channel in a phased manner as checking the radio channel switches of another radio communication terminal connecting to the radio communication terminal 7a.

As described above, according to the second exemplary embodiment, in a channel switch process of a wireless LAN device, a period for operating by channels whose communication channel bands are overlapped is provided and, during the period, communication is performed by the plurality of channels. The radio communication terminal 7a controls the transmission power level according to frame content to be transmitted. Further, the radio communication terminal 7a switches channels in a phased manner from an original channel to a destination channel as checking attribution and synchronization conditions of the other radio communication terminal connecting to the radio communication terminal 7a.

Therefore, according to the second exemplary embodiment, the following effects can be obtained.

The first effect is that channel switch of the radio communication terminal 7a, which starts the communication channel switch process, is performed without disconnecting the communication with the other radio communication terminal connecting to the radio communication terminal 7a.

This is because, in the channel switching process, a period for operating by channels whose communication channel bands overlap with the original or destination channel is provided so that the radio device is capable of communicating by a plurality of channels.

The second effect is that a channel switch of the radio communication terminal 7a, which starts the communication channel switch process, can be performed while maintaining the attribution relation with the other radio communication terminal connecting to the radio communication terminal 7a.

This is because, in addition to the reason of the first effect, the radio communication terminal 7a, which starts the communication channel switch process, controls transmission power level according to frame content to be transmitted in order to lead to the destination channel. This prevents that the radio communication terminal connecting to the radio communication terminal 7a is connected to a different radio communication terminal after the communication channel switch.

The third effect is that a channel switch of radio communication terminal 7a, which starts the communication channel switch process, is performed as preventing a failure of reconnection to the radio communication terminal.

This is because, in addition to the reasons of the first and second effects, channel switch is performed in a phased manner as checking the attribution condition of the radio communication terminal. This prevents that the radio communication terminal connecting to the radio communication terminal 7a cannot find the original radio base station after a communication channel switch and attribution relation is lost.

Here, in FIG. 6, three radio communication terminals are provided in order to simplify the explanation; however, the number of radio communication terminals or their arrangement positions are not limited to the second embodiment.

The present invention can be realized in the same way, even in, for example, a multi-hop structure in which the radio communication terminals 7b and 7c cannot communicate directly and the radio communication terminals 7a relays the communication between the radio communication terminals 7b and 7c.

Regarding Each Exemplary Embodiment

The above described embodiments are preferable embodiments of the present invention. The present invention should not be limited to the embodiments and may be realized with various modifications based on technical idea of the present invention.

For example, the number of connected radio base stations or radio communication terminals should not be considered limited to the above embodiments, but rather is arbitrary. Also, the arranged locations should not be limited to the above embodiments.

The radio base station is described so as to be connected to the base station controller by wire; however, it should not be limited to this, and the present invention may be realized in a structure in which the radio base station may be connected to the base station controller via the radio communications between the radio base stations.

According to the each embodiment, it is described as the radio communication channel is switched to ch1, ch2, and ch3 sequentially when switching from the original channel to the destination channel. However, it should not be limited to this and the present invention can be realized by switching the main communication channel gradually so as to get closer to the destination channel from the original channel.

Further, a processing procedure for realizing the radio communication system of each embodiment is recorded as a program in a computer-readable storage medium (recording medium) so that the above described functions of each embodiments of the present invention can be realized by having a CPU of a computer consisting the system implement the program provided by the recording medium.

Here, the present invention can be employed even when information group including the program are provided to an output device from the above recording medium or an external recording medium via network.

In other words, the program code read from the recording medium itself is configured to realize new functions of the present invention so that the recording medium including the program code and the signals read from the recording medium is included in the present invention.

As the recording medium, for example, floppy disk (registered trademark), hard disk, optical disk, magnetic optical disk, a CD-ROM, a CD-R, a magnetic tape, a nonvolatile memory card, a ROM, an EEPROM, etc. may be employed.

According to the program of the present invention, the radio device, which is controlled based on the program, can realize each functions of the radio communication system according to each embodiment of the present invention.

Further, as availability of the present invention, the present invention may be applied to, for example, radio channel switches in a wireless LAN network system in a multi-cell or multi-hop environment. Particularly, the present invention is preferably applicable to a network system such as voice communication of voIP of wireless LAN, which demands thigh quality and connectivity.

As a first aspect of the present invention, a radio communication system includes a plurality of radio devices for radio communication by a plurality of communication channels. The plurality of radio devices includes a first radio device for starting communication channel switching process and one or more second radio devices. The first radio device includes a channel switching unit for switching a communication channel to a destination channel after switching to a simultaneously-connectable channel capable of a simultaneous communication with an original channel which is currently communicating when the communication channel used for radio communication with the second radio device is to be switched.

A center frequency of the simultaneously-connectable channel is between a center frequency of the original channel and a center frequency of the destination channel. When a plurality of simultaneously-connectable channels exist between the original channel and the destination channel, the channel switching unit preferably switches to the simultaneously-connectable channels sequentially so that center frequency gets closer to the center frequency of the destination channel from the center frequency of the original channel.

The first radio device includes a communication control unit for controlling radio communication with the second radio device. The communication control unit preferably controls to perform radio communication by at least one of the original or destination channel and the simultaneously-connectable channel while switching from the original channel to the destination channel sequentially.

The first radio device includes a switch confirmation unit for confirming whether the radio communication with the second radio device connecting to the first radio device is switched to the destination channel. After the switch confirmation unit confirms that the radio communication with the second radio device is switched to the destination channel, the channel switching unit preferably switches to the destination channel.

When a plurality of simultaneously-connectable channels exist between the original channel and the destination channel and the channel switching unit switches to at least one of the simultaneously-connectable channels, preferably, the switch confirmation unit firstly confirms that the radio communication with the second radio device connecting to the first radio device is switched to the destination channel, and then the channel switching unit switches from the confirmed current simultaneously-connectable channel to the destination channel.

The system preferably further includes a transmission output control unit for controlling to transmit a connectable notification frame of the original channel in a transmission power level lower than a case of a normal radio communication and a connectable notification frame of the destination channel in a transmission power level higher than the case of a normal radio communication during the radio communication by the simultaneously-connectable channel.

The channel switching unit preferably switches to the destination channel while maintaining connection between the first radio device and the second radio device.

Preferably, the first radio device is a radio base station; the second radio device is a radio communication terminal; and the channel switching unit switches to the destination channel while maintaining the attribution condition of the radio communication terminal to the radio base station.

As a second aspect of the present invention, a radio device for radio communication by a plurality of communication channels includes a channel switching unit for switching a communication channel to a destination channel after switching to a simultaneously-connectable channel capable of a simultaneous communication with an original channel which is currently communicating when the communication channel used for radio communication with a connected second radio device is to be switched.

The center frequency of the simultaneously-connectable channel is between a center frequency of the original channel and a center frequency of the destination channel. When a plurality of simultaneously-connectable channels exist between the original channel and the destination channel, the channel switching unit preferably switches to the simultaneously-connectable channels sequentially so that center frequency gets closer to the center frequency of the destination channel from the center frequency of the original channel.

The radio device preferably further includes a communication control unit for controlling radio communication with the second radio device. The communication control unit controls to perform radio communication by at least one of the original or destination channel and the simultaneously-connectable channel while switching from the original channel to the destination channel sequentially.

The radio device preferably further includes a switch confirmation unit for confirming whether the radio communication with the second radio device connecting to the first radio device is switched to the destination channel. After the switch confirmation unit confirms that the radio communication with the second radio device is switched to the destination channel, the channel switching unit switches to the destination channel.

When a plurality of simultaneously-connectable channels exist between the original channel and the destination channel and the channel switching unit switches to at least one of the simultaneously-connectable channels, preferably, the switch confirmation unit firstly confirms that the radio communication with the second radio device connecting to the first radio device is switched to the destination channel, and then the channel switching unit switches from the confirmed current simultaneously-connectable channel to the destination channel.

The radio device preferably further includes a transmission output control unit for controlling to transmit a connectable notification frame of the original channel in a transmission power level lower than a case of a normal radio communication and a connectable notification frame of the destination channel in a transmission power level higher than the case of a normal radio communication during the radio communication by the simultaneously-connectable channel.

The channel switching unit preferably switches to the destination channel while maintaining connection with the second radio device.

Preferably, the radio device is a radio base station; and the channel switching unit switches to the destination channel while maintaining the attribution condition of the second radio device to the radio base station.

As a third aspect of the present invention, according to a communication control method for a radio communication system including a plurality of radio devices for radio communications by a plurality of communication channels, the plurality of radio devices include a first radio device for starting communication channel switching process and one or more second radio devices. The method includes a simultaneously connecting step for switching a communication channel to a simultaneously-connectable channel capable of a simultaneous communication with an original channel which is currently communicating when the first radio device switches the communication channel used for radio communication with the second radio device to the destination channel; and a destination channel switching step for switching to the destination channel after the simultaneously connecting step.

A center frequency of the simultaneously-connectable channel is between a center frequency of the original channel and a center frequency of the destination channel. When a plurality of simultaneously-connectable channels exist between the original channel and the destination channel, in the simultaneously connecting step, the channel is preferably switched to the simultaneously-connectable channels sequentially so that center frequency gets closer to the center frequency of the destination channel from the center frequency of the original channel.

In the simultaneously connecting step, communication is preferably connected between at least one of the original or destination channel and the simultaneously-connectable channel while switching from the original channel to the destination channel sequentially.

The first radio device includes a switch confirmation step for confirming whether the radio communication with the second radio device connecting to the first radio device is switched to the destination channel. After the switch confirmation step confirming that the radio communication with the second radio device is switched to the destination channel, in the channel switching step, the channel is preferably switched to the destination channel.

When a plurality of simultaneously-connectable channels exist between the original channel and the destination channel and the channel is switched to at least one of the simultaneously-connectable channels in the channel switching step, preferably, it is firstly confirmed that the radio communication with the second radio device connecting to the first radio device is switched to the destination channel in the switch confirmation step, and then, the channel is switched from the confirmed current simultaneously-connectable channel to the destination channel in the channel switching step.

In the simultaneously connecting step, preferably, a connectable notification frame of the original channel is transmitted in a transmission power level lower than a case of a normal radio communication and a connectable notification frame of the destination channel is transmitted in a transmission power level higher than the case of a normal radio communication during the radio communication by the simultaneously-connectable channel.

In the simultaneously connecting step and the destination channel switching step, preferably, the channel switch is performed while maintaining connection between the first radio device and the second radio device.

Preferably, the first radio device is a radio base station; the second radio device is a radio communication terminal; and in the simultaneously connecting step and the destination channel switching step, the channel switch is performed while maintaining the attribution condition of the radio communication terminal to the radio base station.

As a fourth aspect of the present invention, according to a communication control program for a radio communication system including a plurality of radio devices for radio communications by a plurality of communication channels, the plurality of radio devices include a first radio device for starting communication channel switching process and one or more second radio devices. The program makes the first radio device to implement a simultaneously connecting process for switching a communication channel to a simultaneously-connectable channel capable of a simultaneous communication with an original channel which is currently communicating when the first radio device switches the communication channel used for radio communication with the second radio device to the destination channel; and a destination channel switching process for switching to the destination channel after the simultaneously connecting process.

A center frequency of the simultaneously-connectable channel is between a center frequency of the original channel and a center frequency of the destination channel. When a plurality of simultaneously-connectable channels exist between the original channel and the destination channel, in the channel switching process, the channel is preferably switched to the simultaneously-connectable channels sequentially so that center frequency gets closer to the center frequency of the destination channel from the center frequency of the original channel.

In the simultaneously connecting process, preferably, communication is connected between at least one of the original or destination channel and the simultaneously-connectable channel while switching from the original channel to the destination channel sequentially.

The communication control program further makes the first radio device to implement a switch confirmation process for confirming whether the radio communication with the second radio device connecting to the first radio device is switched to the destination channel. After the switch confirmation process confirming that the radio communication with the second radio device is switched to the destination channel, in the channel switching process, preferably, the channel is switched to the destination channel.

When a plurality of simultaneously-connectable channels exist between the original channel and the destination channel and the channel is switched to at least one of the simultaneously-connectable channels in the channel switching process, preferably, it is firstly confirmed that the radio communication with the second radio device connecting to the first radio device is switched to the destination channel in the switch confirmation process, and then, the channel is switched from the confirmed current simultaneously-connectable channel to the destination channel in the channel switching process.

In the simultaneously connecting process, preferably, a connectable notification frame of the original channel is transmitted in a transmission power level lower than a case of a normal radio communication and a connectable notification frame of the destination channel is transmitted in a transmission power level higher than the case of a normal radio communication during the radio communication by the simultaneously-connectable channel.

In the simultaneously connecting process and the destination channel switching process, preferably, the channel switch is performed while maintaining connection between the first radio device and the second radio device.

Preferably, the first radio device is a radio base station; the second radio device is a radio communication terminal; and in the simultaneously connecting process and the destination channel switching process, the channel switch is performed while maintaining the attribution condition of the radio communication terminal to the radio base station.

As described above, according to the present invention, communication can be maintained during a channel switch even when a communication channel is switched dynamically. Further, the present invention can prevent changes in a connection relation between radio devices.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A radio communication system, comprising:
  a plurality of radio devices for radio communication by a plurality of communication channels, wherein:
    the plurality of radio devices include a first radio device for starting a communication channel switching process and one or more second radio devices;
    the first radio device includes a channel switching unit for switching a communication channel to a destination channel after switching to a simultaneously-connectable channel capable of a simultaneous communication with an original channel which is currently used for communicating when the communication channel used for radio communication with the second radio device is to be switched; and
    a center frequency of the simultaneously-connectable channel is between a center frequency of the original channel and a center frequency of the destination channel.

2. The radio communication system according to claim 1, wherein when a plurality of simultaneously-connectable channels exist between the original channel and the destination channel, the channel switching unit switches to the simultaneously-connectable channels sequentially so that a center frequency gets closer to the center frequency of the destination channel from the center frequency of the original channel.

3. The radio communication system according to claim 2, wherein
  the first radio device includes a communication control unit for controlling a radio communication with the second radio device, and
  the communication control unit controls to perform the radio communication by at least one of the original or destination channel and the simultaneously-connectable channel while switching from the original channel to the destination channel sequentially.

4. The radio communication system according to claim 1, wherein
  the first radio device includes a switch confirmation unit for confirming whether the radio communication with the second radio device connecting to the first radio device is switched to the destination channel; and
  after the switch confirmation unit confirms that the radio communication with the second radio device is switched to the destination channel, the channel switching unit switches to the destination channel.

5. The radio communication system according to claim 4, wherein when a plurality of simultaneously-connectable channels exist between the original channel and the destination channel and the channel switching unit switches to at least one of the simultaneously-connectable channels, the switch confirmation unit firstly confirms that the radio communication with the second radio device connecting to the first radio device is switched to the destination channel, and then the channel switching unit switches from the confirmed current simultaneously-connectable channel to the destination channel.

6. The radio communication system according to claim 1, wherein the channel switching unit switches to the destination channel while maintaining a connection between the first radio device and the second radio device.

7. The radio communication system according to claim 1, wherein the first radio device comprises a radio base station;
the second radio device comprises a radio communication terminal; and
the channel switching unit switches to the destination channel while maintaining an attribution condition of the radio communication terminal to the radio base station.

8. A radio communication system, comprising:
a plurality of radio devices for radio communication by a plurality of communication channels, wherein:
the plurality of radio devices include a first radio device, for starting a communication channel switching process, and one or more second radio devices; and
the first radio device includes a channel switching unit for switching a communication channel to a destination channel after switching to a simultaneously-connectable channel capable of a simultaneous communication with an original channel which is currently used for communicating when the communication channel used for radio communication with the second radio device is to be switched; and
a transmission output control unit for controlling to transmit a connectable notification frame of the original channel in a transmission power level lower than a case of a normal radio communication and a connectable notification frame of the destination channel in a transmission power level higher than the case of normal radio communication, during the radio communication by the simultaneously-connectable channel.

9. A radio communication system, comprising:
a plurality of radio devices for radio communications by a plurality of communication channels, wherein:
the plurality of radio devices include a first radio device for starting a communication channel switching process and one or more second radio devices;
the first radio device includes channel switching means for switching a communication channel to a destination channel after switching to a simultaneously-connectable channel capable of a simultaneous communication with an original channel which is currently communicating when the communication channel used for radio communication with the second radio device is to be switched; and
a center frequency of the simultaneously-connectable channel is between a center frequency of the original channel and a center frequency of the destination channel.

10. A radio device for radio communication by a plurality of communication channels, said radio device comprising:
a channel switching unit for switching a communication channel to a destination channel after switching to a simultaneously-connectable channel capable of a simultaneous communication with an original channel which is currently used for communicating when the communication channel used for radio communication with a connected second radio device is to be switched, wherein a center frequency of the simultaneously-connectable channel is between a center frequency of the original channel and a center frequency of the destination channel.

11. The radio device according to claim 10, wherein when a plurality of simultaneously-connectable channels exist between the original channel and the destination channel, the channel switching unit switches to the simultaneously-connectable channels sequentially so that a center frequency gets closer to the center frequency of the destination channel from the center frequency of the original channel.

12. The radio device according to claim 11, further comprising a communication control unit for controlling a radio communication with the second radio device,
wherein the communication control unit controls to perform the radio communication by at least one of the original or destination channel and the simultaneously-connectable channel during switching from the original channel to the destination channel sequentially.

13. The radio device according to claim 10, further comprising a switch confirmation unit for confirming whether the radio communication with the second radio device connecting to the first radio device is switched to the destination channel,
wherein after the switch confirmation unit confirms that the radio communication with the second radio device is switched to the destination channel, the channel switching unit switches to the destination channel.

14. The radio device according to claim 13, wherein when a plurality of simultaneously-connectable channels exist between the original channel and the destination channel and the channel switching unit switches to at least one of the simultaneously-connectable channels, the switch confirmation unit firstly confirms that the radio communication with the second radio device connecting to the first radio device is switched to the destination channel, and then the channel switching unit switches from the confirmed current simultaneously-connectable channel to the destination channel.

15. The radio device according to claim 10, wherein the channel switching unit switches to the destination channel while maintaining connection with the second radio device.

16. The radio device according to claim 10, wherein
the radio device comprises a radio base station; and
the channel switching unit switches to the destination channel while maintaining an attribution condition of the second radio device to the radio base station.

17. A radio device for radio communication by a plurality of communication channels, said radio device comprising:
a channel switching unit for switching a communication channel to a destination channel after switching to a simultaneously-connectable channel capable of a simultaneous communication with an original channel which is currently used for communicating when the communication channel used for radio communication with a connected second radio device is to be switched; and
a transmission output control unit for controlling to transmit a connectable notification frame of the original channel in a transmission power level lower than a case of a normal radio communication and a connectable notification frame of the destination channel in a transmission power level higher than the case of normal radio communication during the radio communication by the simultaneously-connectable channel.

18. A radio device for radio communication by a plurality of communication channels, said radio device comprising:
   channel switching means for switching a communication channel to a destination channel after switching to a simultaneously-connectable channel capable of a simultaneous communication with an original channel which is currently used for communicating when the communication channel used for radio communication with a connected second radio device is to be switched,
   wherein a center frequency of the simultaneously-connectable channel is between a center frequency of the original channel and a center frequency of the destination channel.

19. A communication control method for a radio communication system comprising a plurality of radio devices for radio communications by a plurality of communication channels, wherein the plurality of radio devices include a first radio device for starting a communication channel switching process and one or more second radio devices, the method comprising:
   a simultaneously connecting step for switching a communication channel to a simultaneously-connectable channel capable of a simultaneous communication with an original channel which is currently used for communicating when the first radio device switches the communication channel used for radio communication with the second radio device to the destination channel; and
   a destination channel switching step for switching to the destination channel after the simultaneously connecting step,
   wherein a center frequency of the simultaneously-connectable channel is between a center frequency of the original channel and a center frequency of the destination channel.

20. The communication control method according to claim 19, wherein when a plurality of simultaneously-connectable channels exist between the original channel and the destination channel, in the simultaneously connecting step, the plurality of simultaneously-connectable channels are switched sequentially so that a center frequency gets closer to the center frequency of the destination channel from the center frequency of the original channel.

21. The communication control method according to claim 20, wherein
   in the simultaneously connecting step, communication is connected between at least one of the original or destination channel and the simultaneously-connectable channel during switching from the original channel to the destination channel sequentially.

22. The communication control method according to claim 19, wherein
   the first radio device includes a switch confirmation step for confirming whether the radio communication with the second radio device connecting to the first radio device is switched to the destination channel; and
   after the switch confirmation step confirming that the radio communication with the second radio device is switched to the destination channel, in the channel switching step, the channel is switched to the destination channel.

23. The communication control method according to claim 22, wherein
   when a plurality of simultaneously-connectable channels exist between the original channel and the destination channel and the channel is switched to at least one of the simultaneously-connectable channels in the simultaneously connecting step, it is firstly confirmed that the radio communication with the second radio device connecting to the first radio device is switched to the destination channel in the switch confirmation step, and then, the channel is switched from the confirmed current simultaneously-connectable channel to the destination channel in the channel switching step.

24. The communication control method according to claim 19, wherein
   in the simultaneously connecting step and the destination channel switching step, the channel switch is performed while maintaining connection between the first radio device and the second radio device.

25. The communication control method according to claim 19, wherein:
   the first radio device comprises a radio base station;
   the second radio device comprises a radio communication terminal; and
   in the simultaneously connecting step and the destination channel switching step, the channel switch is performed while maintaining an attribution condition of the radio communication terminal to the radio base station.

26. A communication control method for a radio communication system comprising a plurality of radio devices for radio communications by a plurality of communication channels, wherein the plurality of radio devices include a first radio device for starting a communication channel switching process and one or more second radio devices, the method comprising:
   a simultaneously connecting step for switching a communication channel to a simultaneously-connectable channel capable of a simultaneous communication with an original channel which is currently used for communicating when the first radio device switches the communication channel used for radio communication with the second radio device to the destination channel; and
   a destination channel switching step for switching to the destination channel after the simultaneously connecting step,
   wherein in the simultaneously connecting step, a connectable notification frame of the original channel is transmitted in a transmission power level lower than a case of a normal radio communication and a connectable notification frame of the destination channel is transmitted in a transmission power level higher than the case of a normal radio communication during the radio communication by the simultaneously-connectable channel.

27. A tangible computer-readable storage medium tangibly embodying a communication control program for a radio communication system comprising a plurality of radio devices for radio communications by a plurality of communication channels, wherein the plurality of radio devices include a first radio device for starting communication channel switching process and one or more second radio devices, the program causing a computer to perform:
   a simultaneously connecting process for switching a communication channel to a simultaneously-connectable channel capable of a simultaneous communication with an original channel that is currently used for communicating when the first radio device switches the communication channel used for radio communication with the second radio device to a destination channel; and a destination channel switching process for switching to the destination channel after the simultaneously connecting process, wherein a center frequency of the simultaneously-connectable channel is between a center frequency of the original channel and a center frequency of the destination channel.

28. The storage medium according to claim 27, wherein when a plurality of simultaneously-connectable channels exists between the original channel and the destination channel, in the simultaneously connecting process, the channel is switched to the simultaneously-connectable channels sequentially so that a center frequency gets closer to the center frequency of the destination channel from the center frequency of the original channel.

29. The storage medium according to claim 28, wherein in the simultaneously connecting process, communication is connected between at least one of the original or destination channel and the simultaneously-connectable channel during switching from the original channel to the destination channel sequentially.

30. The storage medium according to claim 27, the program further causing a computer to perform a switch confirmation process for confirming whether the radio communication with the second radio device connecting to the first radio device is switched to the destination channel, and wherein after the switch confirmation process confirming that the radio communication with the second radio device is switched to the destination channel, in the channel switching process, the channel is switched to the destination channel.

31. The storage medium according to claim 30, wherein when a plurality of simultaneously-connectable channels exist between the original channel and the destination channel and the channel is switched to at least one of the simultaneously-connectable channels in the channel switching process, it is firstly confirmed that the radio communication with the second radio device connecting to the first radio device is switched to the destination channel in the switch confirmation process, and then, the channel is switched from the confirmed current simultaneously-connectable channel to the destination channel in the channel switching process.

32. The storage medium according to claim 27, wherein in the simultaneously connecting process and the destination channel switching process, the channel switch is performed while maintaining connection between the first radio device and the second radio device.

33. The storage medium according to claim 27, wherein the first radio device comprises a radio base station;

the second radio device comprises a radio communication terminal; and in the simultaneously connecting process and the destination channel switching process, the channel switch is performed while maintaining an attribution condition of the radio communication terminal to the radio base station.

34. A tangible computer-readable storage medium tangibly embodying a communication control program for a radio communication system comprising a plurality of radio devices for radio communications by a plurality of communication channels, wherein the plurality of radio devices include a first radio device for starting communication channel switching process and one or more second radio devices, the program causing a computer to perform:

a simultaneously connecting process for switching a communication channel to a simultaneously-connectable channel capable of a simultaneous communication with an original channel that is currently used for communicating when the first radio device switches the communication channel used for radio communication with the second radio device to a destination channel; and a destination channel switching process for switching to the destination channel after the simultaneously connecting process, wherein in the simultaneously connecting process, a connectable notification frame of the original channel is transmitted in a transmission power level lower than a case of a normal radio communication and a connectable notification frame of the destination channel is transmitted in a transmission power level higher than the case of normal radio communication during the radio communication by the simultaneously-connectable channel.

* * * * *